Jan. 7, 1941.  E. D. BACON  2,227,995

AUTOMATIC LIGHT CONTROL

Original Filed Nov. 30, 1936  2 Sheets-Sheet 1

INVENTOR:
EMRA D. BACON
BY Saywell & Wesseler
ATTORNEYS

Jan. 7, 1941.  E. D. BACON  2,227,995

AUTOMATIC LIGHT CONTROL

Original Filed Nov. 30, 1936  2 Sheets-Sheet 2

INVENTOR:
EMRA D. BACON
BY Saywell and Wessler
ATTORNEYS

Patented Jan. 7, 1941

2,227,995

UNITED STATES PATENT OFFICE 2,227,995

AUTOMATIC LIGHT CONTROL

Emra D. Bacon, Cleveland, Ohio

Continuation of application Serial No. 113,524, November 30, 1936. This application July 21, 1938, Serial No. 220,563

3 Claims. (Cl. 200—38)

My invention relates to automatic light controls, and particularly to improvements in apparatus of this character having simplified, effective, and reliable means for actuating at predetermined times a mercury switch whose several positions determine the functioning of electric lights. My improved automatic light control is a simple construction, having no resistances to burn out or become hot, thus making it practically trouble-proof and assuring a long-life control of high quality at a very low cost. This application is a continuation of my pending application upon Automatic timer and circuit control means, Serial No. 113,524, Nov. 30, 1936.

One adaptation of my invention, which is shown in the accompanying drawings and particularly set forth in the accompanying description, as illustrative of the principle of the invention, relates to installations thereof in poultry houses for the automatic and timed turning on and off of lights, such as bright lights for feeding periods and dim lights for movements of the poultry to and from the roosts. In other words, by such use of the invention, it is designed to crowd the hens respecting their laying periods, increase the length of their scratching periods, and also give them suitable resting periods, by a subdivision of the time into such bright, twilight, and dark periods, as are deemed desirable by the poultry owner.

The improved timing apparatus of my automatic light control, however, is of general adaptation for use in whatever situations there is desired an automatic turning on and off of electric current at predetermined times. Thus, the invention is useful for store lighting, electric signs, lighting of billboards, lighting of show windows, and indeed all desired lighting in apartment houses, stores, for traffic signals, and for many other purposes. The claims of this application are limited to the improved time switch of my automatic light control.

The annexed drawings and the following description set forth in detail certain means illustrating my improved automatic light control, such means constituting, however, but one of the various forms in which the principle of the invention may be embodied.

In said annexed drawings:

Figure 10 is a view similar to Figures 8 and 9, but showing the respective positions of the several parts at the time when the bright lights have just come on;

Figure 11 is a view similar to Figure 9 but showing the positions of the several parts after the bright lights have served their purpose and the dim lights are again on.

Figure 1:
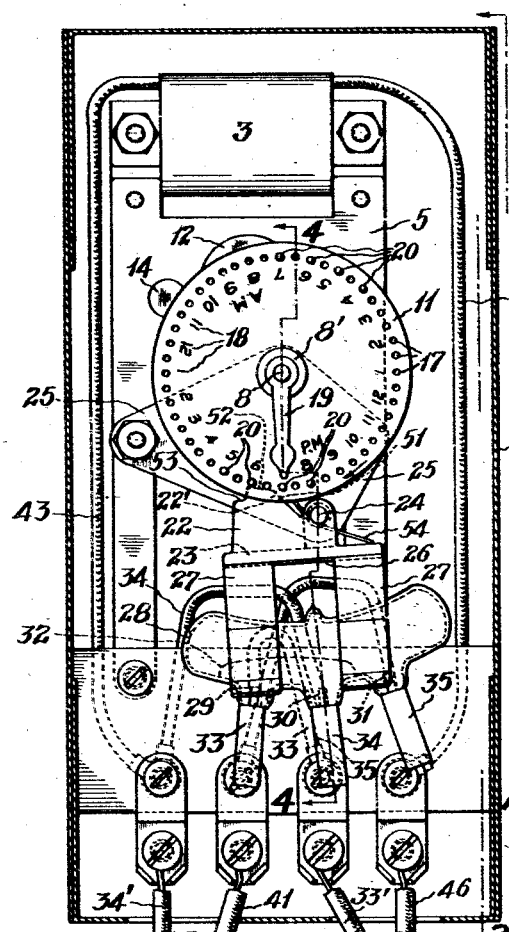
Figure 1 is a vertical section through a casing for my automatic light control, the view being taken in the planes indicated by the line I—I, Figure 2, and showing the improved switch mechanism of the control in elevation, the position of the several parts being such as to render bright certain lights forming part of the lighting system.
Figure 2:
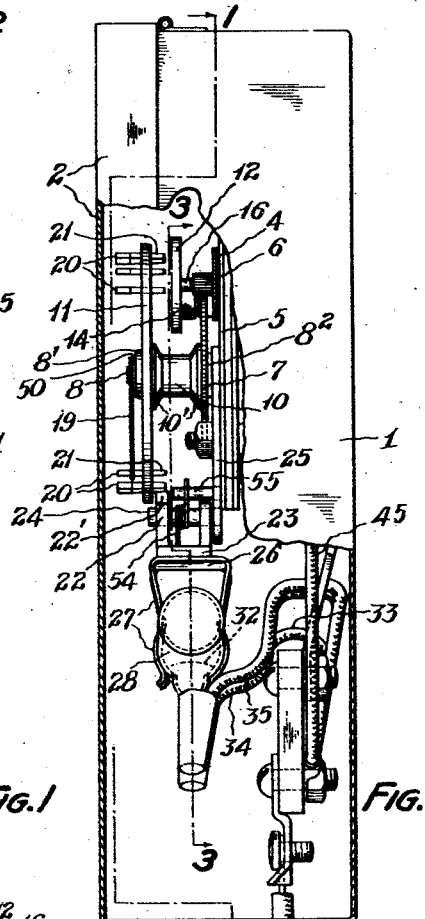
Figure 2 is a side elevation and vertical section, taken in the planes indicated by the line 2—2, Figure 1.

Referring to the annexed drawings in which the same parts are indicated by the same respective members in the several views, my improved automatic light control is shown as housed in a casing 1. Such housing is not necessary in many situations for which the control is adaptable, but very serviceable for that use of the control which is herein particularly shown and described, viz., the automatic turning on and off of lights in poultry houses. The casing 1 is provided with a hinged door 2. Within the casing 1 is mounted an electric clock unit having a motor 3. I do not show the clock mechanism proper since such structure is well known. In a manner and by means well known to those skilled in the art, this clock mechanism is actuated and regulated. This clock mechanism includes a shaft 16, Figure 3, to which the hour hand, for instance, is secured. To this shaft 16, I secure a disc 12 utilized, in a manner and by means hereinafter fully described, manually to set a timing dial 11 in a position so that a pointer 19 cooperating therewith will indicate upon the timing dial 11 the correct time. The means by which the timing dial 11 is so set through the medium of the setting disc 12 are as follows: The setting disc 12 is operable by the human fingers and its rotation effects the rotation of a pinion 13 secured to the shaft 16, Figure 3, this pinion 13 meshing with a gear 4 secured to a shaft 10 mounted in the timer frame member 5, to which shaft 10 is secured a pinion 6 meshing with a gear 7, this gear 7 being loosely mounted upon a pin 8, Figure 5, secured at one end in a plate 25 bolted to the frame member 5. Secured to and adjacent the other end of the pin 8 is a pointer 19. A hub member 10 for the gear 7 forming a journal for the pin 8, and made preferably of lead, is cast between and through the gear 7 and timing dial 11, with the gear 7 and timing dial 11 positioned in the mold in proper cooperative position, the timing dial 11 having previously been formed with a square hole 11' and the gear 7 with a central round hole 7'. The molten lead passes through the hole 11' to form a hub end portion 8' which hugs the outer face of the timing dial 11. The gear 7 is formed also with opposed holes 7² radially spaced from the central hole 7' through which also the casting metal flows to form the hub end portion 8² which hugs the inner face of the gear 7 and the locking bonds 8³, whereby the gear 7 and hub member 10 are rotatably secured together. The ends 10' of the portion of the hub 10 between the gear 7 and the timing dial 11 are made enlarged and cast integrally to the opposed faces of the gear 7 and timing dial 11. A washer 50 is disposed between the hub end portion 8' and the base of the pointer 19. Thus, it is evident that the gear 7, hub 10, and timing dial 11 are integrally secured together. Thus, the actuation of the setting disc 12 in a clockwise direction will effect the rotation of the timing dial 11 on the pin 8 in a clockwise direction and permit the setting of the timing dial 11 in any desired position so that the pointer 19 will indicate the correct time according to the hour indicia 18, Figure 1, provided on the outer face of the timing dial 11 and respectively indicating "A. M." and "P. M." hours, similarly to the showing thereof on a clock face. As is also evident, through the medium of the pinion 15 and associated described gearing the regular rotation of the timing dial 11 from the electric clock mechanism will be effected for the purpose of actuating the time switch in the desired manner, after the timing dial 11 has been set so that the pointer 19 thereof indicates the correct time according to the hour indicia 18. The aforesaid gearing is such as to effect a complete rotation by the electric clock mechanism of the timing dial 11 once in twenty-four hours.

Figure 3:
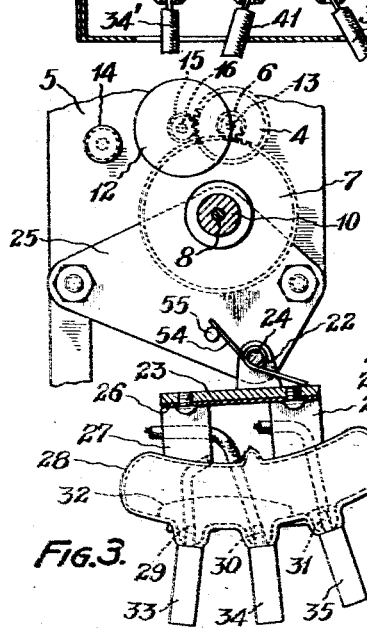
Figure 3 is a fragmentary vertical section, taken in the planes indicated by the line 3—3, Figure 2.
Figures 4, 5:
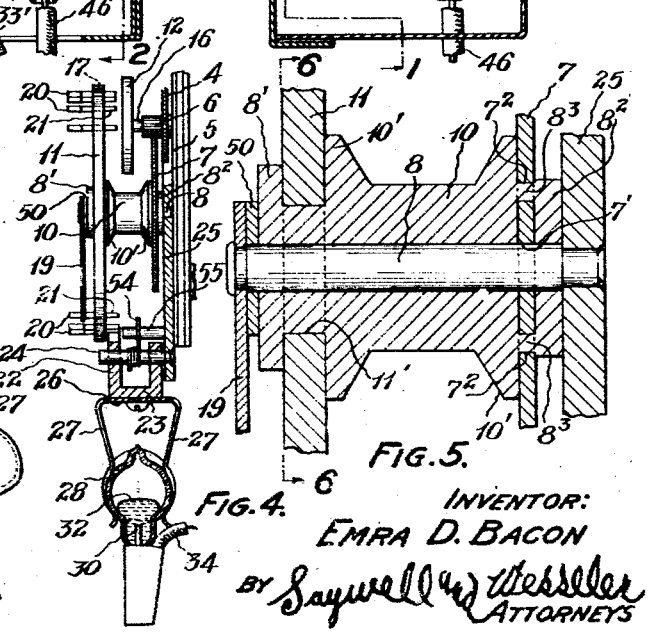
Figure 4 is a fragmentary vertical section, taken in the planes indicated by the line 4—4, Figure 1.
Figure 5 is a fragmentary vertical section, upon an enlarged scale, of certain of the means utilized for driving a timing disc of my improved switch from suitable clock mechanism.

The electric clock unit is provided with any customary type of starting wheel for the hand starting of the clock, such as the wheel 14, Figures 1 and 3, the same being, however, not material to the invention presented herewith.

The timing dial 11 is formed with two series of equally-spaced holes 17 in and adjacent its periphery, each series being twenty-four in number and each series corresponding to a twelve-hour period, thus subdividing A. M. and P. M. time into half-hour periods between centers of adjacent holes 17, each alternate hole 17 being associated with an hour designation 18.

Figure 8:
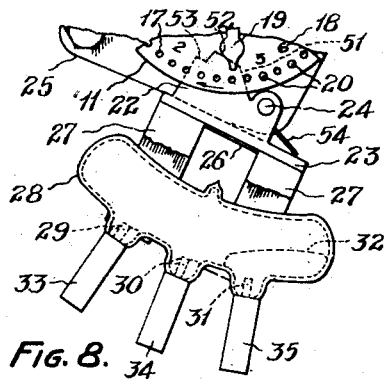
Figure 8 is a fragmentary elevation, showing the timing disc, the pivoted trip arm operated thereby and the mercury switch carried by the trip arm, so relatively positioned that all controlled lights are in an off position.

Each hole 17 is adapted to receive a tapered pin 20, one or more of which are mounted in a corresponding number of the openings 17, for the purpose hereinafter fully described, the smaller ends 21 of the pins 20 being extended inwardly of the timing dial 11. As the timing dial 11 rotates, the inwardly projecting smaller ends 21 of the pins 20 intersect and actuate, at the desired time periods, a trip arm 22 which is, in reality, a hanger, being U-shaped in cross-section at one end, Figure 4, and being pivotally supported, with a base portion 23 depending therefrom, from a pin 24 secured at one end to, and forwardly extended from, the plate 25. A coiled spring 54 mounted on the pin 24, and having one end bearing against a pin 55 secured in, and forwardly extended from, the plate 25, and bearing at the other end against the top of the trip arm member base 23, holds the trip arm 22 normally in the position shown in Figure 8, which is a position, in the use of my invention being disclosed, in which all lights are in an off position.

The insertion of the tapered pins 20 in the holes 17 of the timing dial 11 whereby a shoe 22' of the trip arm 22 is encountered by the small end 21 of the tapered pin 20 is important in that thereby the tendency, due to the contact of the shoe 22' and the end 21 of the pin 20, is to wedge the tapered pin 20 more tightly in the hole 17 rather than to cause the pin to become loosened and drop out. The pins 20 can be arranged to perform any predetermined number of operations in the twenty-four hours and when they are set they will operate automatically without frequent attention. The arrangement of the pins 20 and the manner of mounting them are such that the time periods for the desired operations are quickly and easily changed without necessity of any tools.

Secured to the bottom of the base 23 of the trip arm 22, and flush therewith, is a plate 26 having opposed depending end spring clips 27 adapted to grip and support a mercury switch 28 having three contacts 29, 30, and 31, and mercury content 32 adapted, as the trip arm 22 is swung upon its pivot, to flow over the several contacts 29, 30, and 31 so as, in the several adjusted pivotal positions of the trip arm 22, to lie superimposed upon the contact 31 only, or to bridge the contacts 30 and 31, or to bridge all three contacts 29, 30, and 31, or to bridge contacts 29 and 30.

Figure 9:
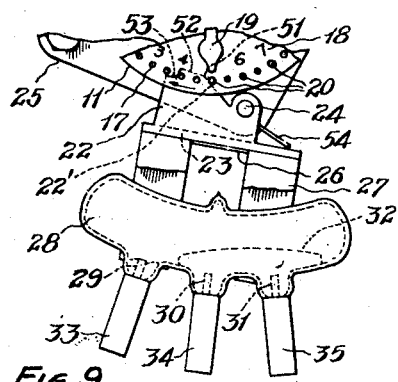
Figure 9 is a view similar to Figure 8, but showing the several elements thereof in those positions when the controlled lights are on dim.
Figure 10:
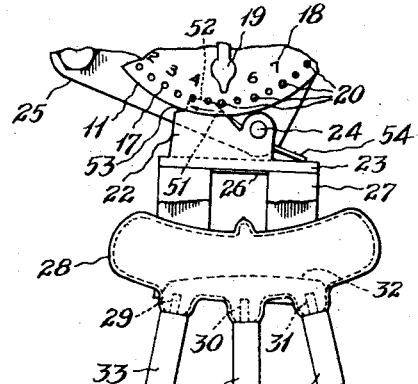
Figure 11:
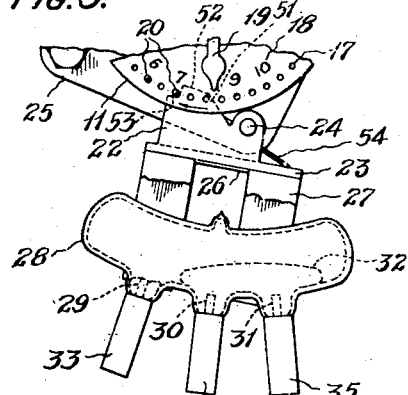
Figure 12:
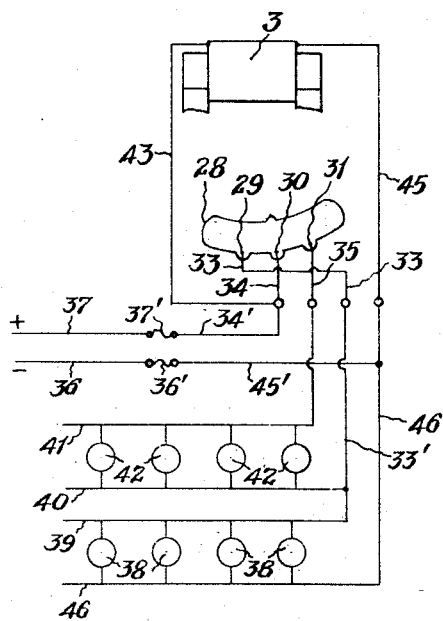
Figure 12 is a diagrammatic view of the electric circuits controlled by the several positions of the mercury switch, the respective open and closed conditions of the several circuits being those which effect bright lighting.
Figures 6, 7:
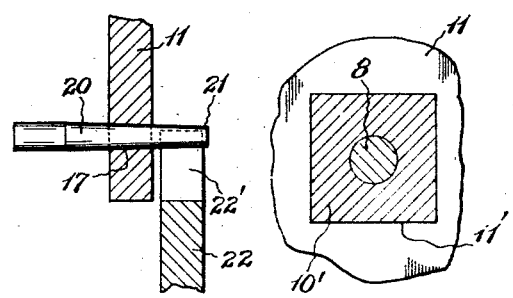
Figure 6 is a fragmentary section, taken in the plane indicated by the line 6—6, Figure 5, and showing a detail of the drive for the timing disc.
Figure 7 is an enlarged fragmentary vertical section showing the relation between a tapered control pin mounted in and carried by the timing disc and a shoe of a pivotal trip arm which carries the mercury switch, certain cam surfaces of which shoe are engaged by the small end of the pin, as the timing disc rotates, thus actuating the mercury switch into its several desired operative positions.

The top portion of the front wall of the trip arm 22 forms a shoe 22' having three cam portions 51, 52, and 53. These cam portions are so disposed that the smaller end 21 of a pin 20 mounted in an opening 17 of the timing dial 11 encounters in succession the cam surfaces 51, 52, and 53, as the timing dial 11 rotates, and tilts the trip arm 22 on the pivotal pin 24 from the position shown in Figure 8, to cause the mercury content 32 of the mercury switch 28 electrically to connect first the contacts 30 and 31, Figure 9, to produce dim light; then all of the contacts 29, 30, and 31, Figure 10, to bring on bright light;

then the contacts 29 and 30, Figures 1 and 3, with the bright light still on; and finally, the contacts 30 and 31, Figure 11, which again induces dim lighting. The pin 20 then passes beyond its sphere of action, and the mercury switch 28 is tilted into the position shown in Figure 8 by the spring 54. The cam surface 52 is substantially equal in length to twice the distance between centers of adjacent holes 17, i. e., it takes one hour for the small end 21 of a single pin 20 to travel across the cam surface 52. Inasmuch as the effect of the cam surfaces 51 and 53 is designed to provide periods simulating dawn and twilight within which the hens are inclined to leave or return to the roost, these cam surfaces 51 and 53 are of a length suitable to provide reasonable dim light periods for this purpose; for instance, twenty minute periods. Therefore, the time consumed in the travel of the pin end 21 across each of the cam surfaces 51 and 53 is about twenty minutes.

Connected to the respective contacts 29, 30 and 31 are conductors 33, 34, and 35, the conductor 34 being connected by an intermediate conductor 34' to the fuse 37' of a main line 37. A second main line 36 is connected by the fuse 36' to an intermediate conductor 45' which connects through a conductor 46 with a conductor 45 running to the motor 3, and connecting the motor 3 with conductor 34' is a conductor 43. The conductor 46 ends in a series of lights 38 which, in the use of my invention, induce bright lighting for poultry work and feeding. A conductor 39 also ends in the other side of the lights 38, and the latter are, hence, in parallel relation as regards the conductors 46 and 39. The conductor 39 also connects through an intermediate conductor 33' with the conductor 33 coming from the contact 29 of the mercury switch 28. Connected with the conductor 39 is a conductor 40 between which and a conductor 41 are provided a series of lights 42, arranged in parallel relation as regards the conductors 40 and 41, which lights 42, in the described application of my invention, are utilized to induce comparatively dim lighting, and thus are utilized to establish periods within which the poultry move from or take the roosts. It is evident that, as regards each other, the two series of lights 38 and 42 are in series. The conductor 41 is connected with the contact 31 of the mercury switch 28 through the conductor 35.

It will be noted that the central contact 30 of the mercury switch 28 is covered by mercury 32, in all positions of the mercury switch 28 except that position in which all lights are off. It will be further noted that, when the left-hand contact 29 of the mercury switch 28 is covered by mercury 32, with the central contact 30, and the right-hand contact 31 is not covered, as shown in Figures 1 and 3, the lights 38 only are in circuit, thus inducing bright lighting. When the right-hand contact 31 is covered by the mercury 32, with the central contact 30, the left-hand contact 29 not being covered, Figures 9 and 11, the lights 38 and the lights 42 are both in circuit in series relation, so that the resultant light is a dim light. When all three contacts 29, 30, and 31 are covered by the mercury 32, Figure 10, the current follows the path of least resistance, i. e., the lights 42 are substantially cut out, and the lights 38 are on, inducing bright lighting.

Assuming that it is desired that bright lighting should be effected at five A. M., Figure 9, a pin 20 is mounted in that hole 17, which will effect the intersection of the cam surface 51 of the shoe 22' with the smaller end 21 of such pin 20 at about twenty minutes to five A. M. Then due to the continued rotation of the timing dial 11, the trip arm 22 is depressed by the pin portion 21 so as to cause the mercury 32 to cover the contacts 31 and 30. As hereinbefore explained, this puts both the lights 38 and 42 in circuit in series relation and the result is a dim light. Such a light in the poultry coop creates the impression upon the hens of day breaking and a tendency therein to leave the roosts and seek the scratch and feeding floor. This condition continues for any reasonable desired period of time, such as twenty minutes, during which time the shoe 22' of the trip arm is progressively forced downwardly until the shoe and hence the mercury switch, has been sufficiently tilted to cause the mercury 32 to cover all three contacts 29, 30 and 31, temporarily, as appears in Figure 10, the current, at this time, following the line of least resistance and creating bright lighting by the lights 38. The continued rotation of the dial 11 causes the pin portion 21 to continue to travel upwardly on the surface 51 and to further tilt the shoe 22' until the cam surface 52 is engaged by the pin portion 21 at which time the shoe 22' and consequently the mercury switch has been sufficiently tilted so that the mercury 32 covers only the contacts 29 and 30, as appears in Figure 1, which cuts out the lights 42 entirely, leaving the lights 38 on in bright condition. It will appear that the surface 52 is so formed that no further tilting of the shoe 22' occurs as long as a pin portion 21 travels along the surface 52. This condition exists for one hour or such multiple of a half hour as is desired. If more than one hour of bright light is desired, it can be increased one-half hour by the addition of an additional pin in the next adjacent hole 17; it can be increased a whole hour by the addition of a pin in the second next hole 17; it can be increased an hour and a half by the addition of pins in the second and third next holes 17; etc. In the showing of the invention which I make in Figure 1, enough pins 20 are positioned in the holes 17, and in the proper holes, so as to provide a feeding and scratching period, under bright lights, for approximately four hours.

After the pin or pins 20 have all entirely passed over the cam surface 52, the shoe 22' tilts in a clockwise direction until the surface 53 engages the pin 20, or the last pin 20, due to the tilting of the trip arm 22 under the action of the spring 54. This results in the movement of the mercury 32 to cover the contacts 30 and 31, Figure 11, which is similar to the showing of Figure 9, and again results in a dim lighting of the poultry house which, in the absence of natural light, induces a tendency in the hens again to seek the roost for a rest period. This action of the hens is facilitated by a cam surface structure 53 that will keep the dim light 42 on for about twenty minutes. Thereafter, the trip arm 22 is released from the pin 20, or the last pin 20, and, under the action of the spring 54, swings into the position shown in Figure 8 wherein all of the lights are off.

Of course, my improved time switch can be set so as to induce the desired lighting at any periods or parts of the twenty-four hour period and probably when the switch is so set as to induce early rising of the poultry, as above explained, the bright lighting would extend into full natural daylight, so that the second dim lighting period would be of no practical benefit, although it would do no harm. Also, if the time switch were so set as to lengthen the period of natural lighting toward the end of day, probably the artificial full lighting would be brought on before the natural lighting was finished, so that in that case the first dim lighting induced by my improved time switch would be of no practical benefit, but what would be used would be the second dim lighting which would serve to induce the hens to go to roost. In other words, the apparatus, in the arrangement shown and described, first induces dim lighting and then bright lighting and then again dim lighting. In the morning, probably the second dim lighting would be of no practical benefit, and in the evening, probably the first dim lighting would be of no practical benefit, but, as stated, neither of these effects would do any harm, being, in fact, probably unnoticeable in natural daylight.

Obviously, by utilizing only a two contact mercury switch 28 as, for instance, the contacts 29 and 30, my improved timing mechanism may be used for ordinary illumination involving only the turning on and off of electric current for lights or other purposes. Furthermore, if a double function operation is required, the additional, or third contact 31, may be employed and thus some other operation performed in conjunction with the use of the contacts 29 and 30. By the new and improved circuit arrangements which I provide, the variation in the illumination produced by the lights is obtained without having to have recourse to the cutting in and out of separate resistances.

What I claim is:

1. An automatic time switch comprising a rotatably-mounted timing dial having time indicia provided thereon, said dial being formed with a series of spaced holes therethrough coordinated with said time indicia, means for automatically rotating the dial, a pivotally mounted trip arm having a shoe portion, a spring for holding said trip arm in a predetermined pivotal position, a pin mounted in a selective hole of the dial and, as the dial is rotated, adapted to intersect said shoe to tilt said trip arm, said shoe having three cam surfaces engaged in succession by said pin to tilt said trip arm into a series of pivotal positions, and a mercury switch depending from said trip arm and having three electric contacts, the cooperative arrangement of the several elements being such that the tilting of the switch by the successive actions of said pin upon said cam surfaces, and also of the action of said spring upon said trip arm, cause the mercury of said switch to cover in succession, first, a pair of said contacts, then all three contacts, then one of said pair of contacts and the third contact, and, finally, said pair of contacts again.

2. An automatic time switch comprising a timing dial provided with spaced holes adjacent the periphery thereof, a frame, a pin fixedly supported by said frame and upon which the dial is mounted, means for rotating said dial on said pin including a gear and a cast journal member forming a hub thereof, said hub member being cast about said gear and the timing dial and thus secured thereto, said gear being loosely mounted on said pin, and said hub member forming a journal for the pin, a trip pin mounted in a selective hole of said dial, a pivotally mounted trip arm having a cam surface intersected by an end of said trip pin, as the dial rotates, to tip the trip arm, a spring normally holding the trip arm in a pivotal position different from that into which it is tipped by said cam surface, and a switch actuated by the movements of said trip arm.

3. In an automatic time switch, an improved timing dial element, comprising a timing dial having time indicia provided thereon and adjacent the periphery thereof, said dial being formed with a series of spaced holes therethrough adjacent said time indicia and coordinated therewith, a cast journal element, a gear, said journal element being cast between said gear and timing dial and having end portions extended through the same, one end portion being secured to the gear, said timing dial being formed with a central non-circular hole through which the other end of said journal member extends and the walls of which it engages to rotate the dial.

EMRA D. BACON.